Sept. 28, 1965    H. E. JOHNSTON ETAL    3,209,122

METHOD OF ARC-WELDING

Filed April 19, 1963

INVENTORS
Harold E. Johnston
and Arnold S. Kitzes
BY
ATTORNEY

United States Patent Office 3,209,122
Patented Sept. 28, 1965

3,209,122
METHOD OF ARC-WELDING
Harold E. Johnston, New Kensington, and Arnold S. Kitzes, Pittsburgh, Pa., assignors to Westinghouse Electric Corporation, Pittsburgh, Pa., a corporation of Pennsylvania
Filed Apr. 19, 1963, Ser. No. 274,112
7 Claims. (Cl. 219—137)

This invention relates to arc-welding and has particular relationship to the sealing or bonding, with pressure-tight and fluid-tight metallurgical bonds, conductors through which a heat-exchange fluid flows. In its specific aspects this invention is applicable to metallurgical bonds between tubular parts of small thickness; for example .035 inch, .049 inch, .065 inch and the like. In its specific aspects this invention also concerns itself with metallurgical bonds between thin-walled tubes for heat exchangers in which the heat exchange fluid is a liquid metal; for example, an alkali such as sodium or potassium, and the fluid flows past the joint between the tubes.

In accordance with the teachings of prior art metallurgical bonds between tubes are formed by butt welding. But butt welding does not readily lend itself to the joining by metallurgical bonds of tubes of relatively small thickness because burn-through occurs and the alkali metal liquid collects in the burned through regions causing failure by reason of corrosion. It is then an object of this invention to provide a method of joining thin-walled tubing by fluid-tight and pressure-tight metallurgical bonds and particularly of producing such metallurgically bonded joints for tubing for heat exchangers through which liquid alkali metal is conducted.

Attempts have been made to overcome the burn-through problems encountered in the butt-welding of thin-walled tubing by forming socket welds in which one of the tubes is inserted in the other and the bond is made between the telescoped tubes. It has been found that the bond between the overlapping tubes has a crevice which is susceptible to stress-corrosion cracking and in addition presents an inhomogeneity in the internal surface of the tubing in which the liquid metal has a tendency to collect. It is a specific object of this invention to provide a metallurgically bonded joint free of internal obstructions between tubes for a heat exchanger in which the heat exchange fluid is a liquid alkali or the like.

This invention in its broadest aspects arises from the realization that to avoid internal obstructions in the joints of a liquid-metal heat exchanger the bonds should be either flush with the internal surface or concaved away from the axis of the tubes. Attempts have been made to achieve this object by providing separate consumable inserts between the ends of the tubes at which the bond is to be made. This expedient has been unsuccessful because the weld penetration required for fluid and pressure tightners was not achieved.

In accordance with this invention an integral insert is produced by bonding projections from the parts to be joined. Once this insert is produced the bond is completed by depositing weld metal preferably by non-consumable electrode welding with a filler rod in the space defined by the insert. The insert is so formed that it extends inwardly from the inner surfaces of the tubes which are joined and the formation of the insert and the subsequent deposit of the weld metal results in a joint in which the inner surface is either concaved away from the axis of the tubes or is flush with the surface. Inward projections which would tend to entrap the liquid metal are not present in the joint.

In accordance with the specific aspects of this invention the ends of the tubes to be joined are provided with projections, the tips of which are of a width small compared to the thickness of the tubes. The tubes are disposed with the tips of the projections abutting, thus forming the joint which is to be metallurgically bonded. The projections are fusion welded with a non-consumable electrode. A low-current arc is produced at the joint of the tips and the adjacent metal. An insert integral with the tubes to be joined is thus produced. The metallurgically bonded joint is then completed by depositing weld metal in the joint between the tubes and the insert.

It has been found that the joint so produced has an internal surface which is either flush with the internal surface of the adjoining tube or is somewhat concave away from the axis of the tubes. Tube assemblies including the bond according to this invention have been used in liquid-metal heat exchangers and it has been found that the liquid-metal is not entrapped at the joint and does not accumulate in an undesired manner. It has also been found that the joints are pressure and fluid-tight so that there is no emission of liquid-metal through them.

In making the joints the projections for the integral inserts should be precisely formed. It is important that the tip of each projection extend inwardly from the inner surface of the associated tubes adequately to assure that the insert does not itself result in an obstruction to the flow of the liquid cooling metal either when it is formed or after the weld metal has been deposited.

The novel features considered characteristic of this invention are disclosed generally above. For a better understanding of this invention both as to its organization and as to its method of operation together with additional objects and advantages thereof reference is made to the following description of the process of this invention taken in connection with the accompanying drawing in which.

Figure 1:
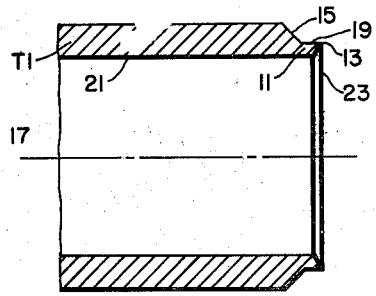
FIGURE 1 is a view in section showing a tube formed to be joined with another tube in the practice of this invention.
Figure 2:
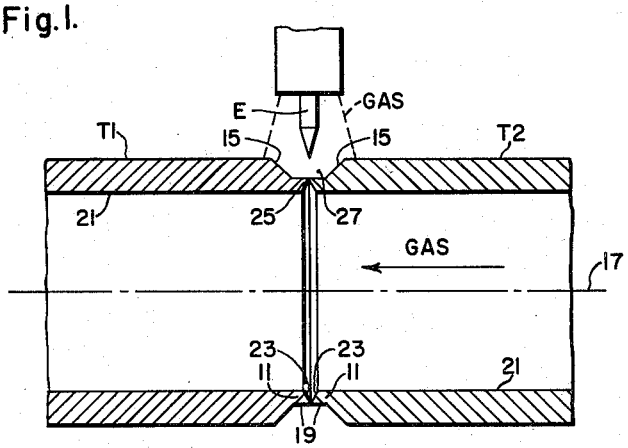
FIG. 2 is a view in section showing the manner in which the integral insert is formed in the practice of this invention.

The drawing shows in cross section a tube T1 (FIGS. 1 and 2) which is to be joined to an abutting tube T2, FIG. 2. These tubes T1 and T2 are typically connected to conduct liquid metal such as sodium or potassium in a heat exchanger. The tube T1 may for example, be connected into a tank through which a secondary liquid is heated by tube T1 producing steam or vapor for a turbine. The tubes T1 and T2 typically may be composed of stainless steel, for example, AISI 316. Typically each tube may have a ⅜₁₆″ or a ½″ outside diameter and a wall thickness such as .049 inch or .065 inch.

Each of the tubes T1 and T2 is prepared for the joining operation by being provided at the end to be joined with a projection 11 having a tip 13. The tip 13 is of very small width (in the direction radially of the tube) compared to the thickness of the tube. The projection 11 is formed in each case by beveling each tube at the end to be welded from the external surface inwardly by grinding or machining, and flaring the end from the internal surface outwardly with a flaring tool. The bevel 15 may be at an angle of about 45° to the axis 17 of the tube. The bevel 15 terminates in a land 19 which typically may have a length equal to about half the thickness of the tube. Thus for a tube of .065 inch thickness the land may have a length along the axis 17 of about 1/32 inch. The bevel 15 and land 19 extend to a predetermined distance from the internal surface 21 of the tube. The flare 23 is formed from the land 19 inwardly to the internal surface 21 of the tube. The flare 23 may be produced with a 60° flaring tool so that it is at an angle of 60° to the axis 21. The flare 23 is rolled by turning the tool. The land 19 and flare 23 terminate in the point 13 which has a width that is small compared to the thickness of the tube.

In carrying out the welding operation the tubes T1 and T2 are placed with the tips 13 of the projections 11 abutting and the lands 19 co-extensive to form a substantially continuous thin cylindrical surface. The internal groove 20 (FIG. 2) between the tubes T1 and T2 is generally annular having an included angle of approximately 60 degrees. The projections are then joined by a weld to form an insert.

The welding is carried out with a non-consumable electrode E in a shield of an inert gas such as argon. Gas is also supplied internally of the tubes T1 and T2 to purge the internal surface of the joint. The tips 13 are fusion welded with a low current arc. Typically the arc current may be between 15 and 20 amperes and the arc voltage between 20 and 30 volts. The shielding gas is commercial argon which is usually of 99.8% purity and flows at the rate of 20 cubic feet per hour. The purge gas which is also commercial argon is permitted to flow substantially freely (about 5 litres per hour) into the tubes without applying pressure to avoid puncturing the joint.

For the purpose of welding, an ordinary non-consumable electrode (TIG) gun may be used. The electrode E should have a very sharp point. An arc is fired between the electrode E and the region where the tips 13 are in contact. The arc length is relatively small. Once the arc is formed the electrode is moved slowly around the joint moving the arc and fusing the metal between the tips 13 and a portion of the lands 19 to form an integral insert 25 (FIG. 2). Thereafter a filler metal is supplied by arc welding with the same gun so that the groove 27 extending outwardly from the insert 25 is filled with weld metal deposited on the insert 25.

Typically there are two filler metal passes with AISI 316LC wire of diameter .040″. The welding current for both passes is between 20 and 25 amperes.

Figure 3:
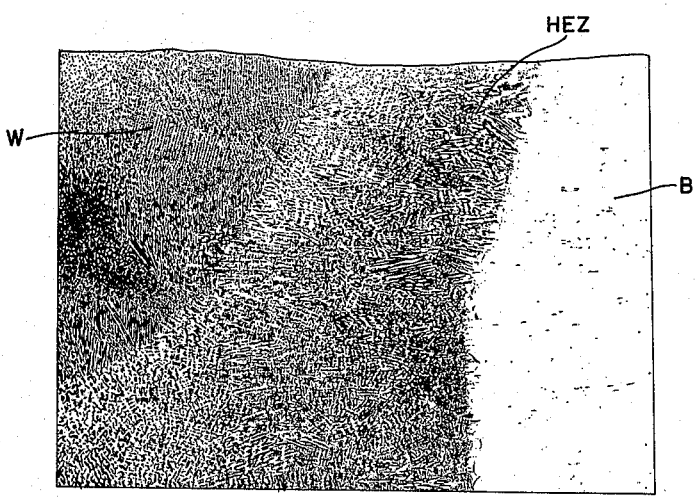
FIG. 3 is a copy of a photomicrograph showing a metallurgical bond made in the practice of this invention.

It has been found that a sound liquid-and-pressure-tight seal is provided in this way. It has also been found that the flow of the heat-exchange liquid metal is not obstructed internally at the end between the tubes T1 and T2. In the seal which is formed the internal surface at the weld is flush with the surface 21 or concaved inwardly. FIG. 3 is a photomicrograph of a typical weld showing the base metal B, the heat-affected zone HEZ and the weld metal W. This photomicrograph shows that the weld is sound.

While this invention, in its specific aspects, is applicable to liquid-metal heat-exchange fluids, in its broader aspects it is also applicable to fluids of other type, for example, pressurized water. In this case the practice of this invention avoids the formation of crevices in which corrosive materials such as chloride ions collect. This invention is also applicable to the conduction of fluids generally and not necessarily for heat-exchange purposes.

While a preferred embodiment of this invention has been disclosed herein many modifications are feasible. This invention then is not to be restricted except insofar as is necessitated by the spirit of the prior art.

We claim as our invention:

1. The method of forming a metallurgical bond between the ends of a plurality of parts which comprises forming a projection from each of said ends, each said projection extending inwardly from both walls of said parts adjacent said end, bringing said projections into abutting engagement with the ends coextensive to form a joint constituting substantially a continuous thin surface, and producing a weld at said joint by firing a welding arc at a starting point of said joint and moving said arc along said joint, the current of said welding arc being set at a low magnitude such as to fuse said joint without substantially damaging or deforming said surface.

2. The method of forming a metallurgical bond between a first part and a second part comprising producing a projection terminating in a tip from the end of each said part, each said tip having an area small compared to the area from which its associated projection extends, engaging the tips in said projections with the ends substantially coextensive to form a joint between said parts, said joint constituting a substantially continuous thin surface, fusion welding said engaged tips with a welding arc to form an integral insert in said joint, the current of said welding arc being set at a low magnitude such as to fuse said joint without substantially damaging or deforming said surface, and depositing weld metal in said joint on said insert to form said bond.

3. The method of forming a metallurgical bond between a plurality of parts with a non-consumable welding electrode which comprises producing a projection at the ends of each of said parts at which said bond is to be formed, said projection extending inwardly within said walls of said parts respectively from both walls of said parts adjacent said end, abutting said parts with said projections in engagement and with said ends coextensive to form a joint constituting substantially a continuous thin surface, firing a welding arc between said electrode and said joint and moving said electrode with said arc moved along said joint to produce said bond, the current of said welding arc being set at a low magnitude such as to fuse said joint without substantially damaging or deforming said surface.

4. The method of forming a metallurgical bond between a first part and a second part by arc welding with a non-consumable welding electrode, which comprises producing a projection having a tip at the end of each said part at which said bond is to be formed, each said tip having an area small compared to the area of the end from which it extends, each said projection extending inwardly from at least one wall adjacent the end from which it extends, abutting said parts with said tips in engagement and said ends coextensive to form a joint between said parts, said joint constituting substantially a continuous thin surface at said tips, firing a welding arc between said engaged tips and said electrode on the side opposite said one wall, moving said electrode with said arc burning along said abutted tips to fusion weld said tip to form an insert in said joint, the current of said welding arc being set at a low magnitude such as to fuse said joint without substantially damaging or deforming said surface, and depositing weld metal in said joint on said insert to form said bond.

5. The method of forming a metallurgical bond between a first tube and a second tube, said bond having no obstructions to the flow of a liquid through said tubes, the said method comprising forming a projection having a tip from the end of each tube at which said bond is to be formed, said tip having an area small compared to the thickness of said tubes and being inwardly within the tubes of the inner walls of said tubes, abutting said tubes with said tips in engagement to form a joint between said tubes, said joint constituting substantially a continuous thin surface at said tips, arc welding said tips by moving a welding arc around the outer periphery of said joint to form an insert in said joint, the current of said welding arc being set at a low magnitude such as to fuse said joint without substantially damaging or deforming said surface, and depositing weld metal on said insert around the external periphery of said joint to form said bond.

6. The method of forming a metallurgical bond between a first part and a second part by arc welding with a non-consumable welding electrode, which comprises producing a projection having a tip at the end of each said part at which said bond is to be formed, each said tip having an area small compared to the area of the end from which it extends, each said projection extending inwardly from at least one wall adjacent the end from which it extends, abutting said parts with said tips in engagement and said ends coextensive to form a joint between said parts, said joint constituting substantially a continuous thin surface at said tips, firing a welding arc between said engaged tips and said electrodes on the side opposite said one wall, shielding said arc in a protective atmosphere, moving said electrode with said arc burning in said atmosphere along said engaged tips, said tips being welded by said arc to form an integral insert in said joint, the current of said welding arc being set at a low magnitude such as to fuse said joint without substantially damaging or deforming said surface, and depositing weld metal in said joint in said insert to form said bond.

7. The method of forming a metallurgical bond between a first tube and a second tube, said bond having no obstructions to the flow of a liquid through said tubes, the said method comprising forming a projection having a tip from the end of each tube at which said bond is to be formed, said tip having an area small compared to the thickness of said tubes and being inwardly within the walls of the inner walls of said tubes, abutting said tube with said tips in engagement to form a joint between said tubes, said joint constituting substantially a continuous thin surface at said tips, arc welding said tips by moving a welding arc shielded in a protective atmosphere around the outer periphery of said joint while purging the inside of said tubes with a protective gas, said welding forming an insert in said joint, the current of said welding arc being set at a low magnitude such as to fuse said joint without substantially damaging or deforming said surface, and depositing weld metal on said insert around the external periphery of said joint to form said bond.

References Cited by the Examiner
UNITED STATES PATENTS

| | | | |
|---|---|---|---|
| 1,496,333 | 6/24 | Woolard | 219—137 |
| 1,577,410 | 3/26 | Smith | 219—137 |
| 1,771,961 | 7/30 | Ipsen | 219—137 |
| 1,830,783 | 11/31 | Burnish | 219—61 |
| 1,868,998 | 7/32 | Stresau | 219—137 |
| 2,288,433 | 6/42 | Boetcher et al. | 219—137 |
| 2,350,716 | 6/44 | Bissout et al. | 78—84 |
| 2,453,061 | 11/48 | Bissout | 219—137 |
| 2,747,065 | 5/56 | Diehl | 219—137 |
| 2,819,517 | 1/58 | Pursell | 29—483 |
| 2,945,942 | 7/60 | Flynn | 219—137 |

RICHARD M. WOOD, *Primary Examiner.*